United States Patent
Kim et al.

(10) Patent No.: US 10,452,980 B1
(45) Date of Patent: Oct. 22, 2019

(54) LEARNING METHOD AND LEARNING DEVICE FOR EXTRACTING FEATURE FROM INPUT IMAGE BY USING CONVOLUTIONAL LAYERS IN MULTIPLE BLOCKS IN CNN, RESULTING IN HARDWARE OPTIMIZATION WHICH ALLOWS KEY PERFORMANCE INDEX TO BE SATISFIED, AND TESTING METHOD AND TESTING DEVICE USING THE SAME

(71) Applicant: Stradvision, Inc., Pohang, Gyeongbuk (KR)

(72) Inventors: Kye-Hyeon Kim, Seoul (KR);
Yongjoong Kim, Gyeongsangbuk-do (KR); Insu Kim, Gyeongsangbuk-do (KR); Hak-Kyoung Kim, Gyeongsangbuk-do (KR); Woonhyun Nam, Pohang-si (KR); SukHoon Boo, Gyeonggi-do (KR); Myungchul Sung, Gyeongsangbuk-do (KR); Donghun Yeo, Gyeongsangbuk-do (KR); Wooju Ryu, Gyeongsangbuk-do (KR); Taewoong Jang, Seoul (KR); Kyungjoong Jeong, Pohang-si (KR); Hongmo Je, Pohang-si (KR); Hojin Cho, Gyeongsangbuk-do (KR)

(73) Assignee: Stradvision, Inc., Pohang, Gyeongbuk (KR)

( * ) Notice: Subject to any disclaimer, the term of this patent is extended or adjusted under 35 U.S.C. 154(b) by 0 days.

(21) Appl. No.: 16/258,221

(22) Filed: Jan. 25, 2019

(51) Int. Cl.
*G06N 3/08* (2006.01)
*G06K 9/62* (2006.01)
(Continued)

(52) U.S. Cl.
CPC ............. *G06N 3/084* (2013.01); *G06F 17/15* (2013.01); *G06F 17/18* (2013.01);
(Continued)

(58) Field of Classification Search
CPC ........... G06N 3/02; G06N 3/08; G06N 3/082; G06N 3/084; G06F 17/15; G06F 17/18;
(Continued)

(56) References Cited

U.S. PATENT DOCUMENTS

2017/0124415 A1* 5/2017 Choi ...................... G06N 3/08
2017/0206431 A1* 7/2017 Sun ........................ G06N 3/084
(Continued)

*Primary Examiner* — Shane D Woolwine
(74) *Attorney, Agent, or Firm* — Kaplan Breyer Schwarz, LLP

(57) ABSTRACT

A learning method for extracting features from an input image by hardware optimization using n blocks in a convolutional neural network (CNN) is provided. The method includes steps of: a learning device instructing a first convolutional layer of a k-th block to elementwise add a (1_1)-st to a (k_1)-st feature maps or their processed feature maps, and instructing a second convolutional layer of the k-th block to generate a (k_2)-nd feature map; and feeding a pooled feature map, generated by pooling an ROI area on an (n_2)-nd feature map or its processed feature map, into a feature classifier; and instructing a loss layer to calculate losses by referring to outputs of the feature classifier and their corresponding GT. By optimizing hardware, CNN throughput can be improved, and the method becomes more appropriate for compact networks, mobile devices, and the like. Further, the method allows key performance index to be satisfied.

24 Claims, 8 Drawing Sheets

(51) Int. Cl.
*G06K 9/00* (2006.01)
*G06F 17/15* (2006.01)
*G06K 9/32* (2006.01)
*G06F 17/18* (2006.01)
*G06T 3/40* (2006.01)
*G06N 3/02* (2006.01)

(52) U.S. Cl.
CPC ....... *G06K 9/00664* (2013.01); *G06K 9/3233* (2013.01); *G06K 9/6267* (2013.01); *G06T 3/4046* (2013.01); *G06N 3/02* (2013.01); *G06N 3/08* (2013.01); *G06N 3/082* (2013.01); *G06T 2207/20081* (2013.01); *G06T 2207/20084* (2013.01)

(58) Field of Classification Search
CPC ............. G06K 9/3233; G06K 9/00664; G06K 9/6267; G06T 2207/20081; G06T 2207/20084; G06T 3/4046
USPC ............................... 706/15, 20; 382/156, 157
See application file for complete search history.

(56) References Cited

U.S. PATENT DOCUMENTS

| | | | |
|---|---|---|---|
| 2018/0096457 A1* | 4/2018 | Savvides | G06K 9/6267 |
| 2019/0019050 A1* | 1/2019 | Roblek | G06T 7/11 |
| 2019/0045168 A1* | 2/2019 | Chaudhuri | H04N 13/111 |
| 2019/0188525 A1* | 6/2019 | Choi | G06K 9/628 |

* cited by examiner

LEARNING METHOD AND LEARNING DEVICE FOR EXTRACTING FEATURE FROM INPUT IMAGE BY USING CONVOLUTIONAL LAYERS IN MULTIPLE BLOCKS IN CNN, RESULTING IN HARDWARE OPTIMIZATION WHICH ALLOWS KEY PERFORMANCE INDEX TO BE SATISFIED, AND TESTING METHOD AND TESTING DEVICE USING THE SAME

FIELD OF THE DISCLOSURE

The present disclosure relates to a learning method, a learning device, a testing method and a testing device for use with an autonomous vehicle; and more particularly, to the learning method and the learning device for extracting features from an input image by using CNN, and the testing method and the testing device using the same.

BACKGROUND OF THE DISCLOSURE

Deep Convolution Neural Networks (Deep CNNs) are the heart of the remarkable development in deep learning. CNNs have already been used in the 90's to solve the problem of character recognition, but their use has become as widespread as it is now thanks to recent research. These deep CNNs won the 2012 ImageNet image classification tournament, crushing other competitors. Then, the convolution neural network became a very useful tool in the field of the machine learning.

The CNN may include a feature extractor that extracts features from an image and a feature classifier that recognizes the image by referring to the features extracted from the feature extractor or detects objects in the image.

According to a conventional CNN, a plurality of blocks including convolutional layers are used to extract features from an image. For example, each of the blocks may apply a 3×3 convolution operation to the image or its corresponding feature map by using a filter kernel having a size of 3×3, to thereby extract the features from the image.

However, according to the convolution operation of the conventional CNN, if it is assumed that the size of the input image is (X, Y), the number of channels of the input image is Z, the size of the filter kernel is (M, M), and the number of filters is L, the amount of computation becomes $XYZM^2L$, the number of parameters becomes $L(ZM^2+1)$, and the amount of computation and the number of parameters increase due to many factors, such as the number of channels, the number of filters, and the kernel size. In order to prevent the degradation of computing performance due to the increase in the amount of computation, a sub-sampled feature map, e.g., a feature map whose size is reduced in comparison with a size of the input image, may be used. However, since the size of the feature map is reduced by such a sub-sampling, a performance of extracting the features for image recognition or object detection may be deteriorated.

Therefore, a method for extracting the features accurately while reducing the amount of computation is proposed.

SUMMARY OF THE DISCLOSURE

It is an object of the present disclosure to solve all the aforementioned problems.

It is another object of the present disclosure to reduce the amount of computation required for extracting features in a convolutional neural network (CNN).

It is still another object of the present disclosure to improve a performance of the feature extraction while reducing the amount of computation.

In accordance with one aspect of the present disclosure, there is provided a learning method for extracting features from an input image by using a first to an n-th blocks in a convolutional neural network (CNN), including steps of: (a) a learning device, if a training image is acquired, (i) instructing a first convolutional layer of a first block to apply a 1×1 convolution operation to the training image to thereby generate a (1_1)-st feature map and (ii) instructing a second convolutional layer of the first block to apply an M×M convolution operation to the (1_1)-st feature map or its processed feature map, to thereby generate a (1_2)-nd feature map; (b) the learning device (i) instructing a first convolutional layer of a k-th block to apply a 1×1 convolution operation to a {(k−1)_2}-nd feature map, outputted from a (k−1)-th block, or its processed feature map, to thereby generate a (k_1)-st feature map, (ii) generating an integrated (k−1)-th feature map by elementwise adding at least part of from the (1_1)-st feature map or its processed feature map to the (k_1)-st feature map or its processed feature map, and (iii) instructing a second convolutional layer of the k-th block to apply an M×M convolution operation to the integrated (k−1)-th feature map or its processed feature map, to thereby generate a (k_2)-nd feature map, by increasing k from 2 to n; and (c) the learning device (i) instructing a pooling layer to pool an area, corresponding to a region of interest (ROI), on an (n_2)-nd feature map or its processed feature map, to thereby generate a pooled feature map, (ii) feeding the pooled feature map into a feature classifier and instructing the feature classifier to recognize the training image or detect at least one object on the training image, and (iii) instructing a loss layer to calculate one or more losses by referring to an output value of the feature classifier and its corresponding ground truth (GT), to thereby adjust at least one parameter of at least part of from the first and the second convolutional layers of the first block to a first and a second convolutional layers of an n-th block through backpropagation by using the losses.

As one example, at the step of (a), the learning device instructs a first batch normalization layer to normalize each of feature values on the (1_1)-st feature map by using averages and variances of the feature values on the (1_1)-st feature map, to thereby generate a normalized (1_1)-st feature map, and instructs a first activation layer of the first block to (i) apply a nonlinear operation to each of the feature values on the normalized (1_1)-st feature map to thereby generate a nonlinear (1_1)-st feature map, and then (ii) feed the nonlinear (1_1)-st feature map into the second convolutional layer of the first block, and, at the step of (b), the learning device (i) instructs a first batch normalization layer of the k-th block to normalize each of feature values on the (k_1)-st feature map by using averages and variances of the feature values on the (k_1)-st feature map, to thereby generate a normalized (k_1)-st feature map, and (ii) instructs a first activation layer of the k-th block to apply a nonlinear operation to each of the feature values on the integrated (k−1)-th feature map which is generated by elementwise adding at least part of from the normalized (1_1)-st feature map to the normalized (k_1)-st feature map, to thereby generate a nonlinear (k_1)-st feature map, and then (iii) feed the nonlinear (k_1)-st feature map into the second convolutional layer of the k-th block.

As one example, at the step of (a), the learning device (i) instructs a first batch normalization layer of the first block to normalize each of the feature values on the (1_1)-st feature map by using averages and variances of the feature values on the (1_1)-st feature map, to thereby generate a normalized (1_1)-st feature map, and (ii) instructs a first activation layer of the first block to (1) apply a nonlinear operation to each of the feature values on the normalized (1_1)-st feature map, to thereby generate a nonlinear (1_1)-st feature map and then (2) feed the nonlinear (1_1)-st feature map into the second convolutional layer of the first block, and, at the step of (b), the learning device (i) instructs a first batch normalization layer of the k-th block to normalize each of feature values on the integrated (k−1)-th feature map which is generated by elementwise adding at least part of from the (1_1)-st feature map to the (k_1)-st feature map, to thereby generate a normalized (k_1)-st feature map, and (ii) instructs a first activation layer of the k-th block to (1) apply a nonlinear operation to each of the feature values on the normalized (k_1)-st feature map to thereby generate a nonlinear (k_1)-st feature map, and then (2) feed the nonlinear (k_1)-st feature map into the second convolutional layer of the k-th block.

As one example, at the step of (a), the learning device (i) instructs a second batch normalization layer of the first block to normalize each of feature values on the (1_2)-nd feature map by using averages and variances of the feature values on the (1_2)-nd feature map, to thereby generate a normalized (1_2)-nd feature map, and (ii) instructs a second activation layer of the first block to (1) apply a nonlinear operation to each of the feature values on the normalized (1_2)-nd feature map to thereby generate a nonlinear (1_2)-nd feature map and then (2) allow the nonlinear (1_2)-nd feature map to be outputted from the first block, and, at the step of (b), the learning device (i) instructs a second batch normalization layer of the k-th block to normalize each of feature values on the (k_2)-nd feature map by using averages and variances of the feature values on the (k_2)-nd feature map, to thereby generate a normalized (k_2)-nd feature map, and (ii) instructs a second activation layer of the k-th block to (1) apply a nonlinear operation to each of the feature values on the normalized (k_2)-nd feature map to thereby generate a nonlinear (k_2)-nd feature map and then (2) allow the nonlinear (k_2)-nd feature map to be outputted from the k-th block.

As one example, the learning device (i) instructs the first convolutional layer of the first block to apply the 1×1 convolution operation to the training image and (ii) instructs the first convolutional layer of the k-th block to apply the 1×1 convolution operation to the {(k−1)_2}-nd feature map or its processed feature map, to thereby increase its feature dimension by C times.

As one example, the C is smaller than the M×M.

In accordance with another aspect of the present disclosure, there is provided a testing method for extracting features from an input image by using a first to an n-th blocks in a convolutional neural network (CNN), including steps of: (a) on condition that a learning device has performed a first process of (i) instructing a first convolutional layer of a first block to apply a 1×1 convolution operation to a training image to thereby generate a (1_1)-st feature map for training and (ii) instructing a second convolutional layer of the first block to apply an M×M convolution operation to the (1_1)-st feature map for training or its processed feature map for training, to thereby generate a (1_2)-nd feature map for training, has performed a second process of (i) instructing a first convolutional layer of a k-th block to apply a 1×1 convolution operation to a {(k−1)_2}-nd feature map for training, outputted from a (k−1)-th block, or its processed feature map for training, to thereby generate a (k_1)-st feature map for training, (ii) generating a (k−1)-th integrated feature map for training by elementwise adding at least part of from the (1_1)-st feature map for training or its processed feature map for training to the (k_1)-st feature map for training or its processed feature map for training, and (iii) instructing a second convolutional layer of the k-th block to apply an M×M convolution operation to the integrated (k−1)-th feature map for training or its processed feature map for training, to thereby generate a (k_2)-nd feature map for training, by increasing k from 2 to n, and has performed a third process of (i) instructing a pooling layer to pool an area for training, corresponding to a region of interest (ROI) for training, on an (n_2)-nd feature map for training or its processed feature map for training, to thereby generate a pooled feature map for training, (ii) feeding the pooled feature map for training into a feature classifier and instructing the feature classifier to recognize the training image or detect at least one object on the training image, and (iii) instructing a loss layer to calculate one or more losses by referring to an output value of the feature classifier and its corresponding ground truth (GT), to thereby adjust at least one parameter of at least part of from the first and the second convolutional layers of the first block to a first and a second convolutional layers of an n-th block through backpropagation by using the losses, a testing device (i) acquiring a test image and instructing the first convolutional layer of the first block to apply the 1×1 convolution operation to the test image to thereby generate a (1_1)-st feature map for testing and (ii) instructing the second convolutional layer of the first block to apply the M×M convolution operation to the (1_1)-st feature map for testing or its processed feature map for testing, to thereby generate a (1_2)-nd feature map for testing; (b) the testing device (i) instructing the first convolutional layer of the k-th block to apply the 1×1 convolution operation to a {(k−1)_2}-nd feature map for testing, outputted from the (k−1)-th block, or its processed feature map for testing, to thereby generate a (k_1)-st feature map for testing, (ii) generating an integrated (k−1)-th feature map for testing by elementwise adding at least part of from the (1_1)-st feature map for testing or its processed feature map for testing to the (k_1)-st feature map for testing or its processed feature map for testing, and (iii) instructing the second convolutional layer of the k-th block to apply the M×M convolution operation to the integrated (k−1)-th feature map for testing or its processed feature map for testing, to thereby generate a (k_2)-nd feature map for testing, by increasing k from 2 to n; and (c) the testing device (i) instructing the pooling layer to pool an area for testing, corresponding to a region of interest (ROI) for testing, on an (n_2)-nd feature map for testing or its processed feature map for testing, to thereby generate a pooled feature map for testing, and (ii) feeding the pooled feature map for testing into the feature classifier and instructing the feature classifier to recognize the test image or detect at least one object on the test image.

As one example, at the step of (a), the testing device instructs a first batch normalization layer to normalize each of feature values on the (1_1)-st feature map for testing by using averages and variances of the feature values on the (1_1)-st feature map for testing, to thereby generate a normalized (1_1)-st feature map for testing, and instructs a first activation layer of the first block to (i) apply a nonlinear operation to each of the feature values on the normalized (1_1)-st feature map for testing to thereby generate a nonlinear (1_1)-st feature map for testing, and then (ii) feed the nonlinear (1_1)-st feature map for testing into the second convolutional layer of the first block, and, at the step of (b), the testing device (i) instructs a first batch normalization layer of the k-th block to normalize each of feature values on the (k_1)-st feature map for testing by using averages and variances of the feature values on the (k_1)-st feature map for testing, to thereby generate a normalized (k_1)-st feature map for testing, and (ii) instructs a first activation layer of the k-th block to apply a nonlinear operation to each of the feature values on the integrated (k−1)-th feature map for testing which is generated by elementwise adding at least part of from the normalized (1_1)-st feature map for testing to the normalized (k_1)-st feature map for testing, to thereby generate a nonlinear (k_1)-st feature map for testing, and then (ii) feed the nonlinear (k_1)-st feature map for testing into the second convolutional layer of the k-th block.

As one example, at the step of (a), the testing device (i) instructs a first batch normalization layer of the first block to normalize each of the feature values on the (1_1)-st feature map for testing by using averages and variances of the feature values on the (1_1)-st feature map for testing, to thereby generate a normalized (1_1)-st feature map for testing, and (ii) instructs a first activation layer of the first block to (1) apply a nonlinear operation to each of the feature values on the normalized (1_1)-st feature map for testing, to thereby generate a nonlinear (1_1)-st feature map for testing and then (2) feed the nonlinear (1_1)-st feature map for testing into the second convolutional layer of the first block, and, at the step of (b), the testing device (i) instructs a first batch normalization layer of the k-th block to normalize each of feature values on the integrated (k−1)-th feature map for testing which is generated by elementwise adding at least part of from the (1_1)-st feature map for testing to the (k_1)-st feature map for testing, to thereby generate a normalized (k_1)-st feature map for testing, and (ii) instructs a first activation layer of the k-block to (1) apply a nonlinear operation to each of the feature values on the normalized (k_1)-st feature map for testing to thereby generate a nonlinear (k_1)-st feature map for testing, and then (2) feed the nonlinear (k_1)-st feature map for testing into the second convolutional layer of the k-th block.

As one example, at the step of (a), the testing device (i) instructs a second batch normalization layer of the first block to normalize each of feature values on the (1_2)-nd feature map for testing by using averages and variances of the feature values on the (1_2)-nd feature map for testing, to thereby generate a normalized (1_2)-nd feature map for testing, and (ii) instructs a second activation layer of the first block to (1) apply a nonlinear operation to each of the feature values on the normalized (1_2)-nd feature map for testing to thereby generate a nonlinear (1_2)-nd feature map for testing and then (2) allow the nonlinear (1_2)-nd feature map for testing to be outputted from the first block, and, at the step of (b), the testing device (i) instructs a second batch normalization layer of the k-th block to normalize each of feature values on the (k_2)-nd feature map for testing by using averages and variances of the feature values on the (k_2)-nd feature map for testing, to thereby generate a normalized (k_2)-nd feature map for testing, and (ii) instructs a second activation layer of the k-th block to (1) apply a nonlinear operation to each of the feature values on the normalized (k_2)-nd feature map for testing to thereby generate a nonlinear (k_2)-nd feature map for testing and then (2) allow the nonlinear (k_2)-nd feature map for testing to be outputted from the k-th block.

As one example, the testing device (i) instructs the first convolutional layer of the first block to apply the 1×1 convolution operation to the test image and (ii) instructs the first convolutional layer of the k-th block to apply the 1×1 convolution operation to the {(k−1)_2}-nd feature map for testing or its processed feature map for testing, to thereby increase its feature dimension for testing by C times.

As one example, the C is smaller than the M×M.

In accordance with still another aspect of the present disclosure, there is provided a learning device for extracting features from an input image by using a first to an n-th blocks in a convolutional neural network (CNN), including: at least one memory that stores instructions; and at least one processor configured to execute the instructions to: perform processes of (I) (i) instructing a first convolutional layer of a first block to apply a 1×1 convolution operation to a training image to thereby generate a (1_1)-st feature map and (ii) instructing a second convolutional layer of the first block to apply an M×M convolution operation to the (1_1)-st feature map or its processed feature map, to thereby generate a (1_2)-nd feature map, (II) (i) instructing a first convolutional layer of a k-th block to apply a 1×1 convolution operation to a {(k−1)_2}-nd feature map, outputted from a (k−1)-th block, or its processed feature map, to thereby generate a (k_1)-st feature map, (ii) generating an integrated (k−1)-th feature map by elementwise adding at least part of from the (1_1)-st feature map or its processed feature map to the (k_1)-st feature map or its processed feature map, and (iii) instructing a second convolutional layer of the k-th block to apply an M×M convolution operation to the integrated (k−1)-th feature map or its processed feature map, to thereby generate a (k_2)-nd feature map, by increasing k from 2 to n, and (III) (i) instructing a pooling layer to pool an area, corresponding to a region of interest (ROI), on an (n_2)-nd feature map or its processed feature map, to thereby generate a pooled feature map, (ii) feeding the pooled feature map into a feature classifier and instructing the feature classifier to recognize the training image or detect at least one object on the training image, and (iii) instructing a loss layer to calculate one or more losses by referring to an output value of the feature classifier and its corresponding ground truth (GT), to thereby adjust at least one parameter of at least part of from the first and the second convolutional layers of the first block to a first and a second convolutional layers of an n-th block through backpropagation by using the losses.

As one example, at the process of (I), the processor instructs a first batch normalization layer to normalize each of feature values on the (1_1)-st feature map by using averages and variances of the feature values on the (1_1)-st feature map, to thereby generate a normalized (1_1)-st feature map, and instructs a first activation layer of the first block to (i) apply a nonlinear operation to each of the feature values on the normalized (1_1)-st feature map to thereby generate a nonlinear (1_1)-st feature map, and then (ii) feed the nonlinear (1_1)-st feature map into the second convolutional layer of the first block, and, at the process of (II), the processor (i) instructs a first batch normalization layer of the k-th block to normalize each of feature values on the (k_1)-st feature map by using averages and variances of the feature values on the (k_1)-st feature map, to thereby generate a normalized (k_1)-st feature map, and (ii) instructs a first activation layer of the k-th block to apply a nonlinear operation to each of the feature values on the integrated (k−1)-th feature map which is generated by elementwise adding at least part of from the normalized (1_1)-st feature map to the normalized (k_1)-st feature map, to thereby generate a nonlinear (k_1)-st feature map, and then (ii) feed the nonlinear (k_1)-st feature map into the second convolutional layer of the k-th block.

As one example, at the process of (I), the processor (i) instructs a first batch normalization layer of the first block to normalize each of the feature values on the (1_1)-st feature map by using averages and variances of the feature values on the (1_1)-st feature map, to thereby generate a normalized (1_1)-st feature map, and (ii) instructs a first activation layer of the first block to (1) apply a nonlinear operation to each of the feature values on the normalized (1_1)-st feature map, to thereby generate a nonlinear (1_1)-st feature map and then (2) feed the nonlinear (1_1)-st feature map into the second convolutional layer of the first block, and, at the process of (II), the processor (i) instructs a first batch normalization layer of the k-th block to normalize each of feature values on the integrated (k−1)-th feature map which is generated by elementwise adding at least part of from the (1_1)-st feature map to the (k_1)-st feature map, to thereby generate a normalized (k_1)-st feature map, and (ii) instructs a first activation layer of the k-block to (1) apply a nonlinear operation to each of the feature values on the normalized (k_1)-st feature map to thereby generate a nonlinear (k_1)-st feature map, and then (2) feed the nonlinear (k_1)-st feature map into the second convolutional layer of the k-th block.

As one example, at the process of (I), the processor (i) instructs a second batch normalization layer of the first block to normalize each of feature values on the (1_2)-nd feature map by using averages and variances of the feature values on the (1_2)-nd feature map, to thereby generate a normalized (1_2)-nd feature map, and (ii) instructs a second activation layer of the first block to (1) apply a nonlinear operation to each of the feature values on the normalized (1_2)-nd feature map to thereby generate a nonlinear (1_2)-nd feature map and then (2) allow the nonlinear (1_2)-nd feature map to be outputted from the first block, and, at the process of (II), the processor (i) instructs a second batch normalization layer of the k-th block to normalize each of feature values on the (k_2)-nd feature map by using averages and variances of the feature values on the (k_2)-nd feature map, to thereby generate a normalized (k_2)-nd feature map, and (ii) instructs a second activation layer of the k-th block to (1) apply a nonlinear operation to each of the feature values on the normalized (k_2)-nd feature map to thereby generate a nonlinear (k_2)-nd feature map and then (2) allow the nonlinear (k_2)-nd feature map to be outputted from the k-th block.

As one example, the processor (i) instructs the first convolutional layer of the first block to apply the 1×1 convolution operation to the training image and (ii) instructs the first convolutional layer of the k-th block to apply the 1×1 convolution operation to the {(k−1)_2}-nd feature map or its processed feature map, to thereby increase its feature dimension by C times.

As one example, the C is smaller than the M×M.

In accordance with still yet another aspect of the present disclosure, there is provided a testing device for extracting features from an input image by using a first to an n-th blocks in a convolutional neural network (CNN), including: at least one memory that stores instructions; and at least one processor, on condition that a learning device has performed a first process of (i) instructing a first convolutional layer of a first block to apply a 1×1 convolution operation to a training image to thereby generate a (1_1)-st feature map for training and (ii) instructing a second convolutional layer of the first block to apply an M×M convolution operation to the (1_1)-st feature map for training or its processed feature map for training, to thereby generate a (1_2)-nd feature map for training, has performed a second process of (i) instructing a first convolutional layer of a k-th block to apply a 1×1 convolution operation to a {(k−1)_2}-nd feature map for training, outputted from a (k−1)-th block, or its processed feature map for training, to thereby generate a (k_1)-st feature map for training, (ii) generating a (k−1)-th integrated feature map for training by elementwise adding at least part of from the (1_1)-st feature map for training or its processed feature map for training to the (k_1)-st feature map for training or its processed feature map for training, and (iii) instructing a second convolutional layer of the k-th block to apply an M×M convolution operation to the integrated (k−1)-th feature map for training or its processed feature map for training, to thereby generate a (k_2)-nd feature map for training, by increasing k from 2 to n, and has performed a third process of (i) instructing a pooling layer to pool an area for training, corresponding to a region of interest (ROI) for training, on an (n_2)-nd feature map for training or its processed feature map for training, to thereby generate a pooled feature map for training, (ii) feeding the pooled feature map for training into a feature classifier and instructing the feature classifier to recognize the training image or detect at least one object on the training image, and (iii) instructing a loss layer to calculate one or more losses by referring to an output value of the feature classifier and its corresponding ground truth (GT), to thereby adjust at least one parameter of at least part of from the first and the second convolutional layers of the first block to a first and a second convolutional layers of an n-th block through backpropagation by using the losses; configured to execute the instructions to: perform processes of (I) (i) instructing the first convolutional layer of the first block to apply the 1×1 convolution operation to a test image to thereby generate a (1_1)-st feature map for testing and (ii) instructing the second convolutional layer of the first block to apply the M×M convolution operation to the (1_1)-st feature map for testing or its processed feature map for testing, to thereby generate a (1_2)-nd feature map for testing, (II) (i) instructing the first convolutional layer of the k-th block to apply the 1×1 convolution operation to a {(k−1)_2}-nd feature map for testing, outputted from the (k−1)-th block, or its processed feature map for testing, to thereby generate a (k_1)-st feature map for testing, (ii) generating an integrated (k−1)-th feature map for testing by elementwise adding at least part of from the (1_1)-st feature map for testing or its processed feature map for testing to the (k_1)-st feature map for testing or its processed feature map for testing, and (iii) instructing the second convolutional layer of the k-th block to apply the M×M convolution operation to the integrated (k−1)-th feature map for testing or its processed feature map for testing, to thereby generate a (k_2)-nd feature map for testing, by increasing k from 2 to n, and (III) (i) instructing the pooling layer to pool an area for testing, corresponding to a region of interest (ROI) for testing, on an (n_2)-nd feature map for testing or its processed feature map for testing, to thereby generate a pooled feature map for testing, and (ii) feeding the pooled feature map for testing into the feature classifier and instructing the feature classifier to recognize the test image or detect at least one object on the test image.

As one example, at the process of (I), the processor instructs a first batch normalization layer to normalize each of feature values on the (1_1)-st feature map for testing by using averages and variances of the feature values on the (1_1)-st feature map for testing, to thereby generate a normalized (1_1)-st feature map for testing, and instructs a first activation layer of the first block to (i) apply a nonlinear operation to each of the feature values on the normalized (1_1)-st feature map for testing to thereby generate a nonlinear (1_1)-st feature map for testing, and then (ii) feed the nonlinear (1_1)-st feature map for testing into the second convolutional layer of the first block, and, at the process of (II), the processor (i) instructs a first batch normalization layer of the k-th block to normalize each of feature values on the (k_1)-st feature map for testing by using averages and variances of the feature values on the (k_1)-st feature map for testing, to thereby generate a normalized (k_1)-st feature map for testing, and (ii) instructs a first activation layer of the k-th block to apply a nonlinear operation to each of the feature values on the integrated (k−1)-th feature map for testing which is generated by elementwise adding at least part of from the normalized (1_1)-st feature map for testing to the normalized (k_1)-st feature map for testing, to thereby generate a nonlinear (k_1)-st feature map for testing, and then (ii) feed the nonlinear (k_1)-st feature map for testing into the second convolutional layer of the k-th block.

As one example, at the process of (I), the processor (i) instructs a first batch normalization layer of the first block to normalize each of the feature values on the (1_1)-st feature map for testing by using averages and variances of the feature values on the (1_1)-st feature map for testing, to thereby generate a normalized (1_1)-st feature map for testing, and (ii) instructs a first activation layer of the first block to (1) apply a nonlinear operation to each of the feature values on the normalized (1_1)-st feature map for testing, to thereby generate a nonlinear (1_1)-st feature map for testing and then (2) feed the nonlinear (1_1)-st feature map for testing into the second convolutional layer of the first block, and, at the process of (II), the processor (i) instructs a first batch normalization layer of the k-th block to normalize each of feature values on the integrated (k−1)-th feature map for testing which is generated by elementwise adding at least part of from the (1_1)-st feature map for testing to the (k_1)-st feature map for testing, to thereby generate a normalized (k_1)-st feature map for testing, and (ii) instructs a first activation layer of the k-block to (1) apply a nonlinear operation to each of the feature values on the normalized (k_1)-st feature map for testing to thereby generate a nonlinear (k_1)-st feature map for testing, and then (2) feed the nonlinear (k_1)-st feature map for testing into the second convolutional layer of the k-th block.

As one example, at the process of (I), the processor (i) instructs a second batch normalization layer of the first block to normalize each of feature values on the (1_2)-nd feature map for testing by using averages and variances of the feature values on the (1_2)-nd feature map for testing, to thereby generate a normalized (1_2)-nd feature map for testing, and (ii) instructs a second activation layer of the first block to (1) apply a nonlinear operation to each of the feature values on the normalized (1_2)-nd feature map for testing to thereby generate a nonlinear (1_2)-nd feature map for testing and then (2) allow the nonlinear (1_2)-nd feature map for testing to be outputted from the first block, and, at the process of (II), the processor (i) instructs a second batch normalization layer of the k-th block to normalize each of feature values on the (k_2)-nd feature map for testing by using averages and variances of the feature values on the (k_2)-nd feature map for testing, to thereby generate a normalized (k_2)-nd feature map for testing, and (ii) instructs a second activation layer of the k-th block to (1) apply a nonlinear operation to each of the feature values on the normalized (k_2)-nd feature map for testing to thereby generate a nonlinear (k_2)-nd feature map for testing and then (2) allow the nonlinear (k_2)-nd feature map for testing to be outputted from the k-th block.

As one example, the processor (i) instructs the first convolutional layer of the first block to apply the 1×1 convolution operation to the test image and (ii) instructs the first convolutional layer of the k-th block to apply the 1×1 convolution operation to the {(k−1)_2}-nd feature map for testing or its processed feature map for testing, to thereby increase its feature dimension for testing by C times.

As one example, the C is smaller than the M×M.

BRIEF DESCRIPTION OF THE DRAWINGS

The above and other objects and features of the present disclosure will become apparent from the following description of preferred embodiments given in conjunction with the accompanying drawings, in which.

DETAILED DESCRIPTION OF THE PREFERRED EMBODIMENTS

Figure 1:
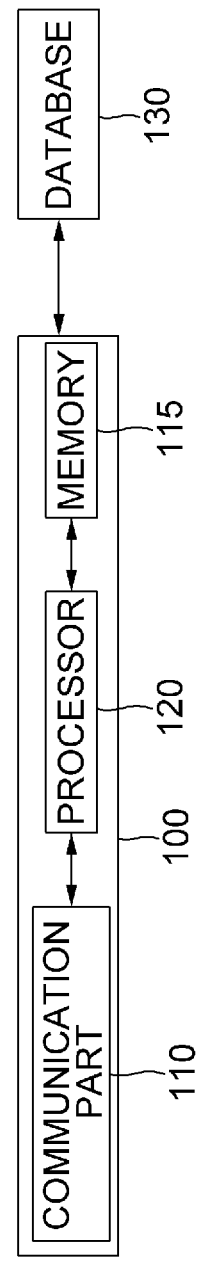
FIG. 1 is a drawing schematically illustrating a learning device for extracting features from a training image by using convolutional layers in multiple blocks in a convolutional neural network (CNN) in accordance with one example embodiment of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits, and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to the present disclosure to be carried out easily, the example embodiments of the present disclosure by referring to attached diagrams will be explained in detail as shown below.

FIG. 1 is a drawing illustrating a learning device for extracting features from a training image by using a first to an n-th convolutional layers in multiple blocks in a convolutional neural network (CNN) in accordance with one example embodiment of the present disclosure. Referring to FIG. 1, a learning device 100 may include a communication part 110 and a processor 120. In addition, the learning device may further include a memory 115 capable of storing computer readable instructions for performing following processes. As one example, the processor, the memory, a medium, etc. may be integrated with an integrated processor.

First of all, the communication part 110 may acquire the training image. Herein, the training image may be stored in a database 130, and the database may contain ground truths (GTs) corresponding to training images.

Thereafter, the processor 120 may perform a process of (i) instructing a first convolutional layer of a first block to apply a 1×1 convolution operation to the training image to thereby generate a (1_1)-st feature map and (ii) instructing a second convolutional layer of the first block to apply an M×M convolution operation to the (1_1)-st feature map or its processed feature map, to thereby generate a (1_2)-nd feature map. Further, the processor 120 may perform a process of (i) instructing a first convolutional layer of a k-th block to apply a 1×1 convolution operation to a {(k−1)_2}-nd feature map, outputted from a (k−1)-th block, or its processed feature map, to thereby generate a (k_1)-st feature map, (ii) generating an integrated (k−1)-th feature map by element-wise adding at least part of from the (1_1)-st feature map or its processed feature map to the (k_1)-st feature map or its processed feature map, and (iii) instructing a second convolutional layer of the k-th block to apply an M×M convolution operation to the integrated (k−1)-th feature map or its processed feature map, to thereby generate a (k_2)-nd feature map, by increasing k from 2 to n. Thereafter, the processor 120 may perform a process of (i) instructing a pooling layer to pool an area, corresponding to a region of interest (ROI), on an (n_2)-nd feature map or its processed feature map, to thereby generate a pooled feature map, (ii) feeding the pooled feature map into a feature classifier and instructing the feature classifier to recognize the training image or detect at least one object on the training image, and (iii) instructing a loss layer to calculate one or more losses by referring to an output value of the feature classifier and its corresponding ground truth (GT), to thereby adjust at least one parameter of at least part of from the first and the second convolutional layers of the first block to a first and a second convolutional layers of an n-th block through backpropagation by using the losses.

Herein, any computing device having a processor capable of computation may be used as the learning device 100 in accordance with one example embodiment of the present disclosure. Further, FIG. 1 illustrates only one learning device 100, but the present disclosure is not limited to this example. That is, the present disclosure may be configured with a plurality of learning devices.

The method of extracting the features from the training image by using the first to the n-th blocks in the CNN in accordance with one example embodiment of the present disclosure will be described by referring to FIG. 2.

First of all, if the training image is received, the learning device 100 instructs the first block C1 to apply a depthwise separable convolution operation to the training image to thereby output a first feature map or its processed feature map. Further, the learning device 100 instructs a second block C2 to an n-th block CN to sequentially apply its corresponding depthwise separable convolution operation to its corresponding feature map outputted from a previous block or its processed feature map, to thereby generate a second feature map or its processed feature map to an n-th feature map or its processed feature map.

Hereinafter, the process of sequentially applying each of the depthwise separable convolution operations to the training image or its corresponding feature map outputted from a previous block by using the first block C1 to the n-th block CN will be described in detail by referring to FIGS. 3A to 3B.

First of all, if the training image is acquired, the learning device 100 instructs the first convolutional layer C1_1 of the first block C1 to apply the 1×1 convolution operation to the training image, to thereby output the (1_1)-st feature map. Since the amount of computation of the 1×1 convolution operation is $1/M^2$ of that of the M×M convolution operation, a channel of the feature map may be increased C times in order to enhance a performance of the feature extraction. Herein, the C may be M×M. Namely, a feature dimension, which is increased by C times in the same computing performance compared to the M×M convolution, may be used. Further, the learning device 100 instructs the second convolutional layer C1_4 of the first block C1 to apply the M×M convolution operation to the (1_1)-st feature map or its processed feature map, to thereby output the (1_2)-nd feature map.

Herein, the learning device 100 (i) instructs the first convolutional layer C1_1 of the first block C1 to apply the 1×1 convolution operation to the training image to thereby output the (1_1)-st feature map, and (ii) instructs a first batch normalization layer C1_2 of the first block to normalize each of the feature values on the (1_1)-st feature map by using averages and variances of the feature values on the (1_1)-st feature map, to thereby generate a normalized (1_1)-st feature map. Further, the normalized feature map may be shown as Equation 1 below. Herein, γ and β are parameters to be learned, $x^{(k)}$ is a k-th dimension of an input value x, and $\hat{x}^{(k)}$ is a value which is generated by normalizing the batch by using the average and the variance.

$$y^{(k)} = \gamma^{(k)} \hat{x}^{(k)} + \beta^{(k)}$$ [Equation 1]

$$\hat{x}^{(k)} = \frac{x^{(k)} - E[x^{(k)}]}{\sqrt{\operatorname{Var}[x^{(k)}]}}$$

Further, the learning device 100 instructs a first activation layer C1_3 of the first block C1 to (i) apply a nonlinear operation to each of the feature values on the normalized (1_1)-st feature map to thereby generate a nonlinear (1_1)-st feature map, and then (ii) feed the nonlinear (1_1)-st feature map into the second convolutional layer C1_4 of the first block C1. Herein, the nonlinear operation may be ReLU, but the present disclosure is not limited to this example.

Further, the learning device 100 instructs the second convolutional layer C1_4 of the first block C1 to apply the M×M convolution operation to the (1_1)-st feature map or the nonlinear (1_1)-st feature map, to thereby output the (1_2)-nd feature map, and instructs a second batch normalization layer C1_5 of the first block C1 to normalize each of feature values on the (1_2)-nd feature map by using averages and variances of the feature values on the (1_2)-nd feature map, to thereby generate a normalized (1_2)-nd feature map according to the Equation 1. Further, the learning device 100 instructs a second activation layer C1_6 of the first block to (1) apply a nonlinear operation to each of the feature values on the normalized (1_2)-nd feature map to thereby generate a nonlinear (1_2)-nd feature map and then (2) allow the nonlinear (1_2)-nd feature map to be outputted from the first block C1.

Thereafter, the learning device 100 (i) instructs a first convolutional layer CK_1 of the k-th block Ck to apply the 1×1 convolution operation to the {(k−1)_2}-nd feature map, outputted from the (k−1)-th block C(K−1), or its processed feature map, to thereby generate a (k_1)-st feature map, (ii) generates an integrated (k−1)-th feature map by elementwise adding at least part of from the (1_1)-st feature map or its processed feature map to the (k_1)-st feature map or its processed feature map, and (iii) instructs a second convolutional layer CK_4 of the k-th block CK to apply the M×M convolution operation to the integrated (k−1)-th feature map or its processed feature map, to thereby generate a (k_2)-nd feature map, by increasing k from 2 to n.

Herein, the learning device 100 (i) instructs the first convolutional layer CK_1 of the k-th block CK to apply the 1×1 convolution operation to the {(k−1)_2}-nd feature map, outputted from the (k−1)-th block C(K−1), or its processed feature map, to thereby generate the (k_1)-st feature map, and (ii) instructs a first batch normalization layer CK_2 of the k-th block CK to normalize each of feature values on the (k_1)-st feature map by using averages and variances of the feature values on the (k_1)-st feature map, to thereby generate a normalized (k_1)-st feature map. Further, the learning device 100 (i) instructs a first activation layer CK_3 of the k-th block CK to apply a nonlinear operation to each of the feature values on the integrated (k−1)-th feature map which is generated by elementwise adding at least part of from the normalized (1_1)-st feature map to the normalized (k_1)-st feature map, to thereby generate a nonlinear (k_1)-st feature map, and then (ii) feeds the nonlinear (k_1)-st feature map into the second convolutional layer CK_4 of the k-th block CK.

Further, the learning device 100 (i) instructs the second convolutional layer CK_4 of the k-th block CK to apply the M×M convolution operation to the integrated (k−1)-th feature map or its processed feature map, to thereby generate a (k_2)-nd feature map, and (ii) instructs a second batch normalization layer CK 5 of the k-th block CK to normalize each of feature values on the (k_2)-nd feature map by using averages and variances of the feature values on the (k_2)-nd feature map, to thereby generate a normalized (k_2)-nd feature map by the Equation 1. Further, the learning device 100 instructs a second activation layer CK_6 of the k-th block CK to (1) apply a nonlinear operation to each of the feature values on the normalized (k_2)-nd feature map to thereby generate a nonlinear (k_2)-nd feature map and then (2) allow the nonlinear (k_2)-nd feature map to be outputted from the k-th block CK.

Further, it is described above that the integrated (k−1)-th feature map is generated by elementwise adding at least part of from the normalized (1_1)-st feature map to the normalized (k_1)-st feature map, and then the non-linear operation is applied to the integrated (K−1)-th feature map by the first activation layer CK_3 of the k-th block CK. As another example, the integrated (k−1)-th may also be generated by elementwise adding at least part of from the (1_1)-st feature map, outputted from the first convolutional layer C1_1 of the first block C1, to the (k_1)-st feature map, outputted from the first convolutional layer CK_1 of the k-th block CK.

Figure 4A:
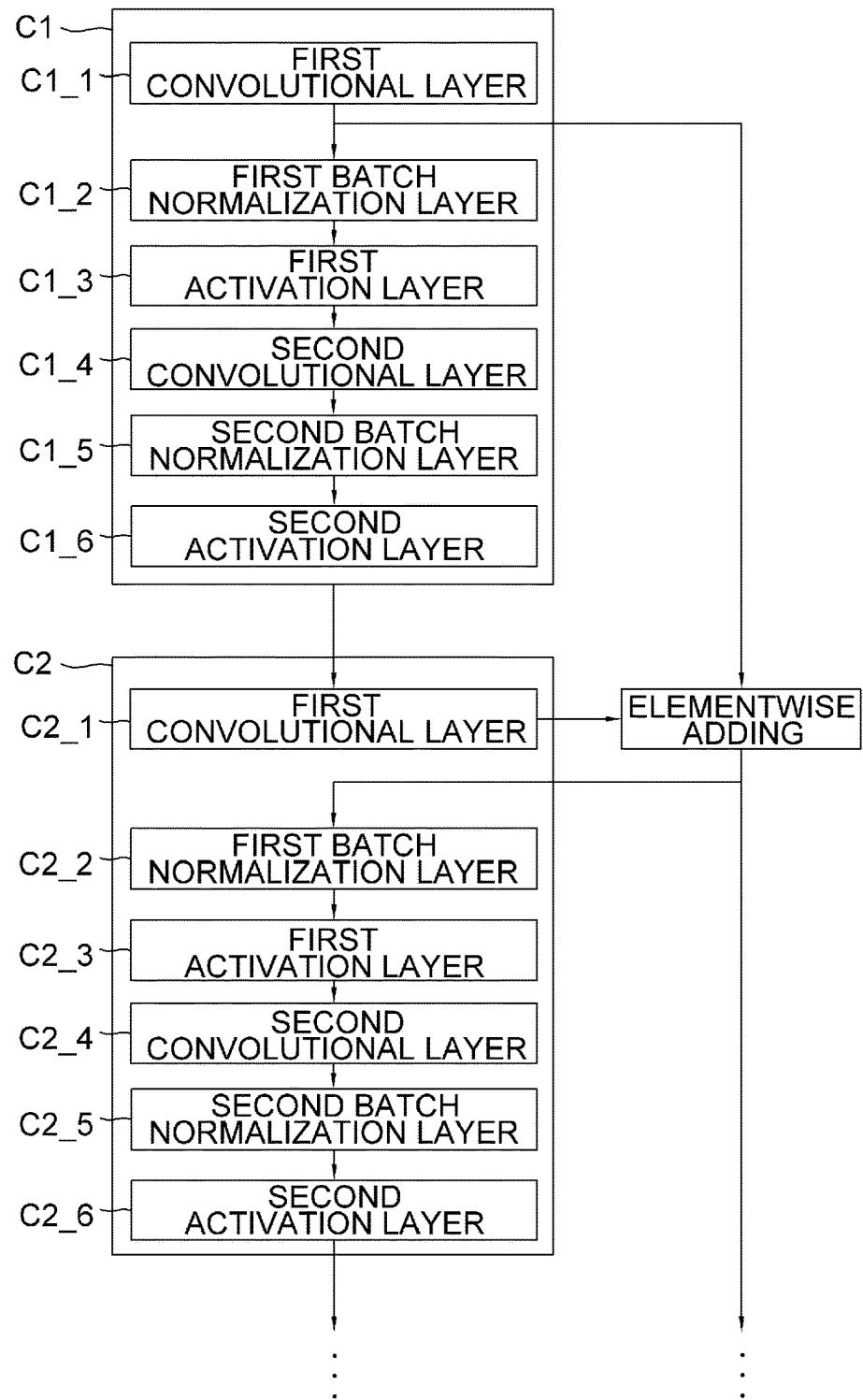
FIGS. 4A and 4B are drawings schematically illustrating a configuration of the convolutional layers in the multiple blocks in accordance with another example embodiment of the present disclosure.
Figure 4B:
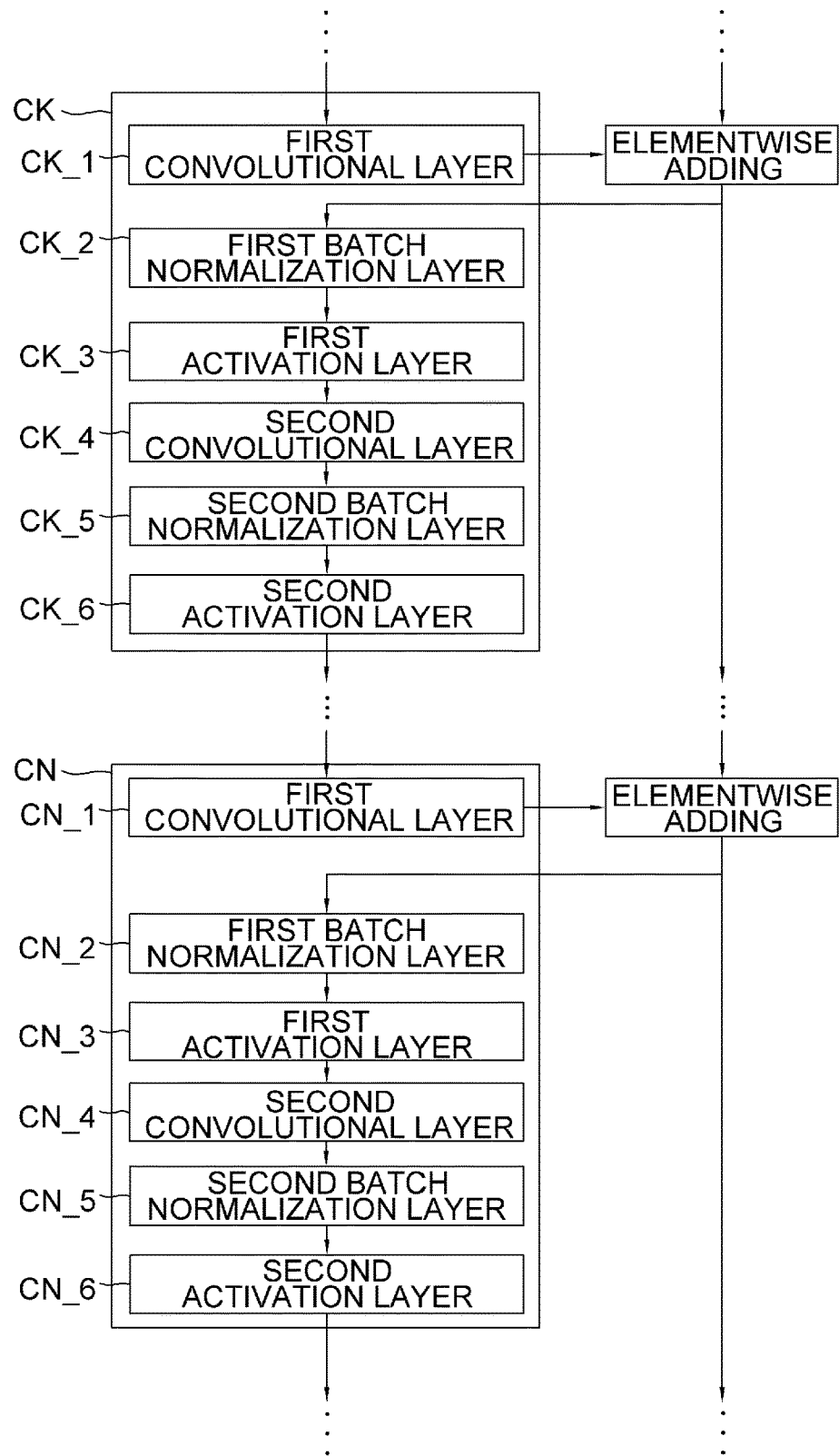

Namely, referring to FIGS. 4A and 4B, the integrated (k−1)-th feature map may also be generated by elementwise adding at least part of from the (1_1)-st feature map, outputted from the first convolutional layer C1_1 of the first block C1, to the (k_1)-st feature map, outputted from the first convolutional layer CK_1 of the k-th block CK. Then, the learning device 100 instructs the first batch normalization layer CK_2 of the k-th block CK to normalize each of feature values on the integrated (k−1)-th feature map by using averages and variances of the feature values on the integrated (k−1)-th feature map, to thereby generate the normalized (k_1)-st feature map. Further, the learning device 100 instructs the first activation layer CK_3 of the k-th block CK to apply a nonlinear operation to each of the feature values on the normalized (k_1)-st feature map to thereby output a nonlinear (k_1)-st feature map, and feed the nonlinear (k_1)-st feature map into the second convolutional layer CK_4 of the k-th block CK.

Referring to FIG. 2 again, the learning device 100 (i) instructs a pooling layer 122 to pool an area, corresponding to a region of interest (ROI), on an (n_2)-nd feature map, outputted from the n-th block CN, or its processed feature map, to thereby generate a pooled feature map, (ii) feeds the pooled feature map into a feature classifier 123 and instructs the feature classifier 123 to recognize the training image or detect at least one object on the training image.

Further, the learning device instructs a loss layer 124 to calculate one or more losses by referring to an output value of the feature classifier 123 and its corresponding ground truth (GT), to thereby adjust at least one parameter of at least part of from the first and the second convolutional layers CN_1 and CN_4 of the first block C1 to the first and the second convolutional layers CN-1 and CN-4 of the n-th block CN through backpropagation by using the losses.

Figure 5:
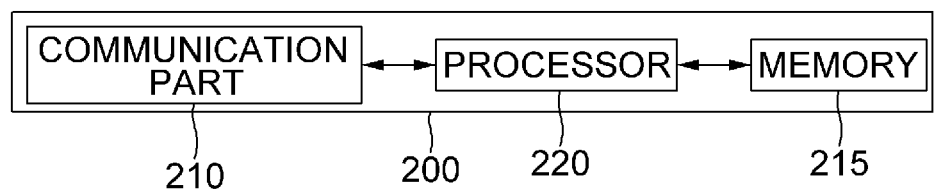
FIG. 5 is a drawing schematically illustrating a testing device for extracting features from a test image by using a first to an n-th blocks in the CNN in accordance with one example embodiment of the present disclosure.

FIG. 5 is a drawing schematically illustrating a testing device for extracting features from a test image by using the first to the n-th blocks in the CNN in accordance with one example embodiment of the present disclosure. Referring to FIG. 5, a testing device 200 may include a communication part 210 and a processor 220. In addition, the testing device may further include a memory 215 capable of storing computer readable instructions for performing following processes. As one example, the processor, the memory, a medium, etc. may be integrated with an integrated processor.

First of all, the communication part 210 may acquire the test image.

Herein, at least one parameter of from the first and the second convolutional layers of the first block to the first and the second convolutional layers of the n-th block may have been adjusted by the learning device 100.

For reference, in the description below, the phrase "for training" is added for terms related to the learning processes, and the phrase "for testing" is added for terms related to testing processes, to avoid possible confusion.

Namely, as described in FIGS. 4A to 4B, if the training image is acquired, (I) the learning device (i) has instructed the first convolutional layer of the first block to apply the 1×1 convolution operation to the training image to thereby generate the (1_1)-st feature map for training and (ii) has instructed the second convolutional layer of the first block to apply an M×M convolution operation to the (1_1)-st feature map for training or its processed feature map for training, to thereby generate the (1_2)-nd feature map for training; (II) the learning device (i) has instructed the first convolutional layer of the k-th block to apply the 1×1 convolution operation to the {(k−1)_2}-nd feature map for training, outputted from the (k−1)-th block, or its processed feature map for training, to thereby generate the (k_1)-st feature map for training, (ii) has generated the (k−1)-th integrated feature map for training by elementwise adding at least part of from the (1_1)-st feature map for training or its processed feature map for training to the (k_1)-st feature map for training or its processed feature map for training, and (iii) has instructed the second convolutional layer of the k-th block to apply an M×M convolution operation to the integrated (k−1)-th feature map for training or its processed feature map for training, to thereby generate the (k_2)-nd feature map for training, by increasing k from 2 to n; and (III) the learning device (i) has instructed the pooling layer to pool an area, corresponding to the region of interest (ROI), on the (n_2)-nd feature map for training or its processed feature map for training, to thereby generate the pooled feature map for training, (ii) has fed the pooled feature map for training into the feature classifier and instructing the feature classifier to recognize the training image or detect at least one object on the training image, and (iii) has instructed the loss layer to calculate one or more losses by referring to the output value of the feature classifier and its corresponding ground truth (GT), to thereby adjust at least one parameter of at least part of from the first and the second convolutional layers of the first block to the first and the second convolutional layers of the n-th block through backpropagation by using the losses.

On this condition, the processor 220 (i) instructs the first convolutional layer of the first block to apply the 1×1 convolution operation to the test image to thereby generate a (1_1)-st feature map for testing and (ii) instructs the second convolutional layer of the first block to apply the M×M convolution operation to the (1_1)-st feature map for testing or its processed feature map for testing, to thereby generate a (1_2)-nd feature map for testing. Then the processor 220 (i) instructs the first convolutional layer of the k-th block to apply the 1×1 convolution operation to a {(k−1)_2}-nd feature map for testing, outputted from the (k−1)-th block, or its processed feature map for testing, to thereby generate a (k_1)-st feature map for testing, (ii) generates an integrated (k−1)-th feature map for testing by elementwise adding at least part of from the (1_1)-st feature map for testing or its processed feature map for testing to the (k_1)-st feature map for testing or its processed feature map for testing, and (iii) instructs the second convolutional layer of the k-th block to apply the M×M convolution operation to the integrated (k−1)-th feature map for testing or its processed feature map for testing, to thereby generate a (k_2)-nd feature map for testing, by increasing k from 2 to n.

Further, the processor 220 (i) instructs the pooling layer 222 to pool an area, corresponding to a region of interest (ROI), on an (n_2)-nd feature map for testing or its processed feature map, to thereby generate a pooled feature map for testing, (ii) feeds the pooled feature map for testing into the feature classifier 223 and instructs the feature classifier 223 to recognize the test image or detect at least one object on the test image.

Herein, any computing device including the processor having a computation capability may be adopted as the testing device in accordance with the present disclosure. Further, FIG. 5 illustrates only one testing device 200, but the present disclosure is not limited to this example. The present disclosure may be configured by a plurality of testing devices.

Figure 6:
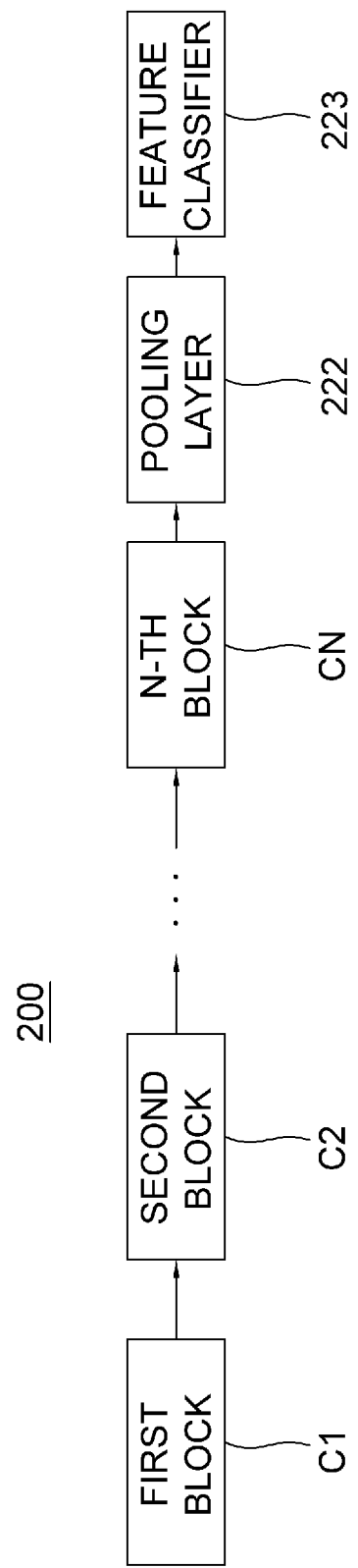
FIG. 6 is a drawing schematically illustrating a testing method for extracting the features from the test image by using the convolutional layers in the multiple blocks in accordance with one example embodiment of the present disclosure.

The method of extracting features from the test image by using the first to the n-th convolutional layers in the multiple blocks in the CNN are described as follows by referring to FIG. 6. In the description below, the detailed description on the testing method, easily understandable from the learning method by referring to FIGS. 2, 4A and 4B, will be omitted.

Figure 2:
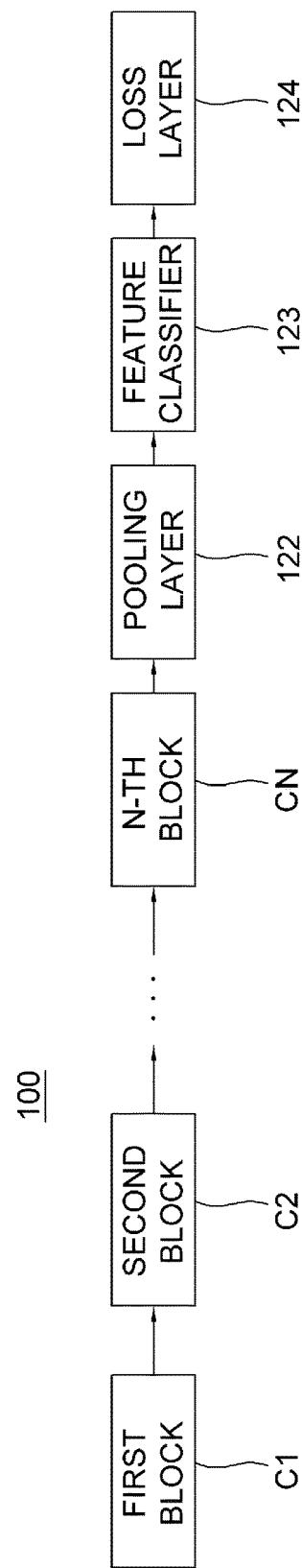
FIG. 2 is a drawing schematically illustrating a learning method for extracting the features from the training image by using the convolutional layers in the multiple blocks in accordance with one example embodiment of the present disclosure.

First of all, as described in FIGS. 2, 4A and 4B, on condition that at least one parameter of at least part of from the first and the second convolutional layers C1_1 and C1_4 of the first block C1 to the first and the second convolutional layers CN_1 and CN_4 of the n-th block CN has been adjusted, if the test image is acquired, the testing device 100 instructs the first block C1 to apply the depthwise separable convolution operation to the test image to thereby output a first feature map for testing. Further, the testing device 100 instructs each of the second block C2 to the n-th block CN to sequentially apply its corresponding depthwise separable convolution operation to a feature map for testing outputted from its corresponding previous block or its processed feature map, to thereby generate a second feature map for testing or its processed feature map for testing to an n-th feature map for testing or its processed feature map for testing.

Figure 3A:
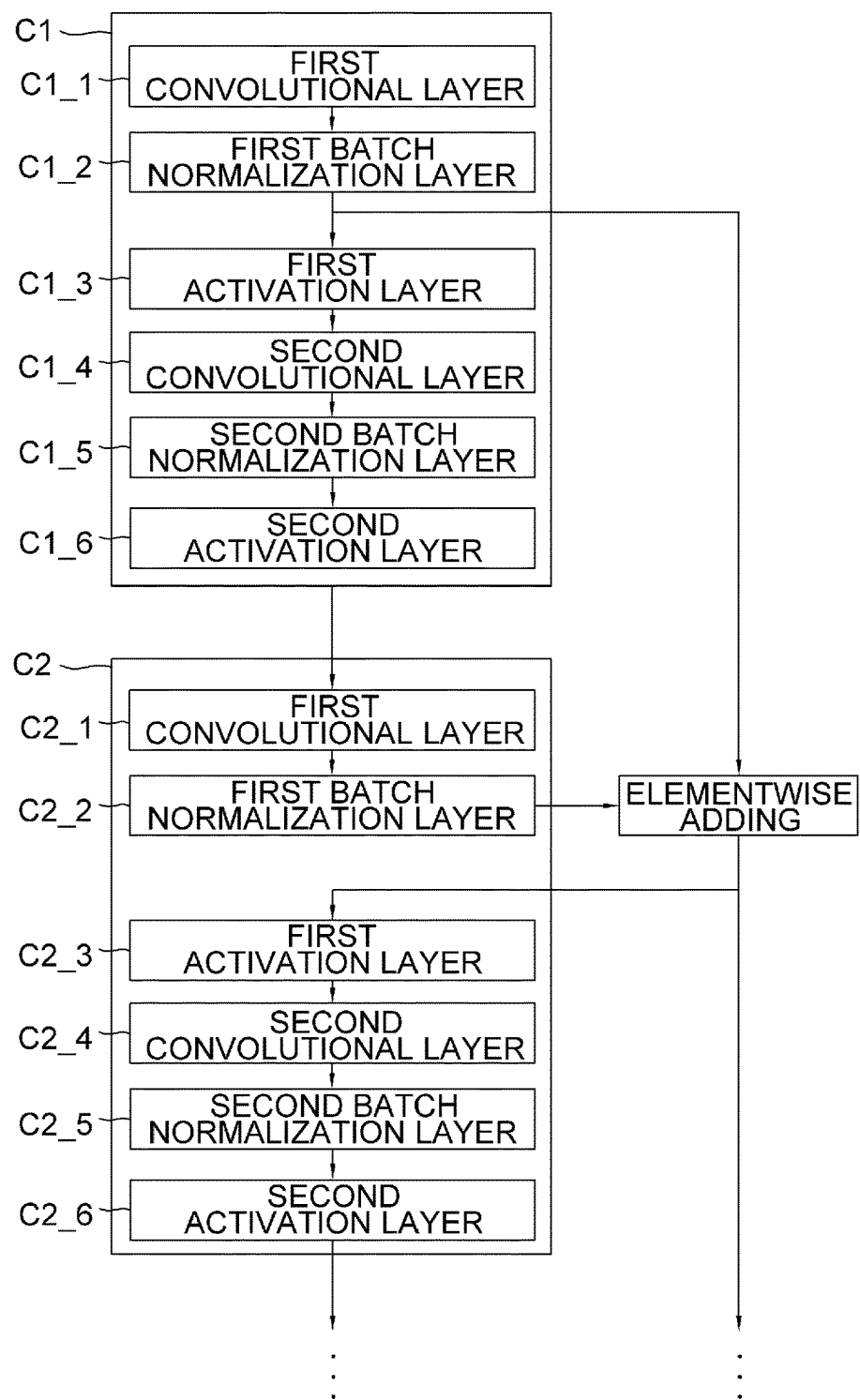
FIGS. 3A and 3B are drawings schematically illustrating a configuration of the convolutional layers in the multiple blocks in accordance with one example embodiment of the present disclosure.
Figure 3B:
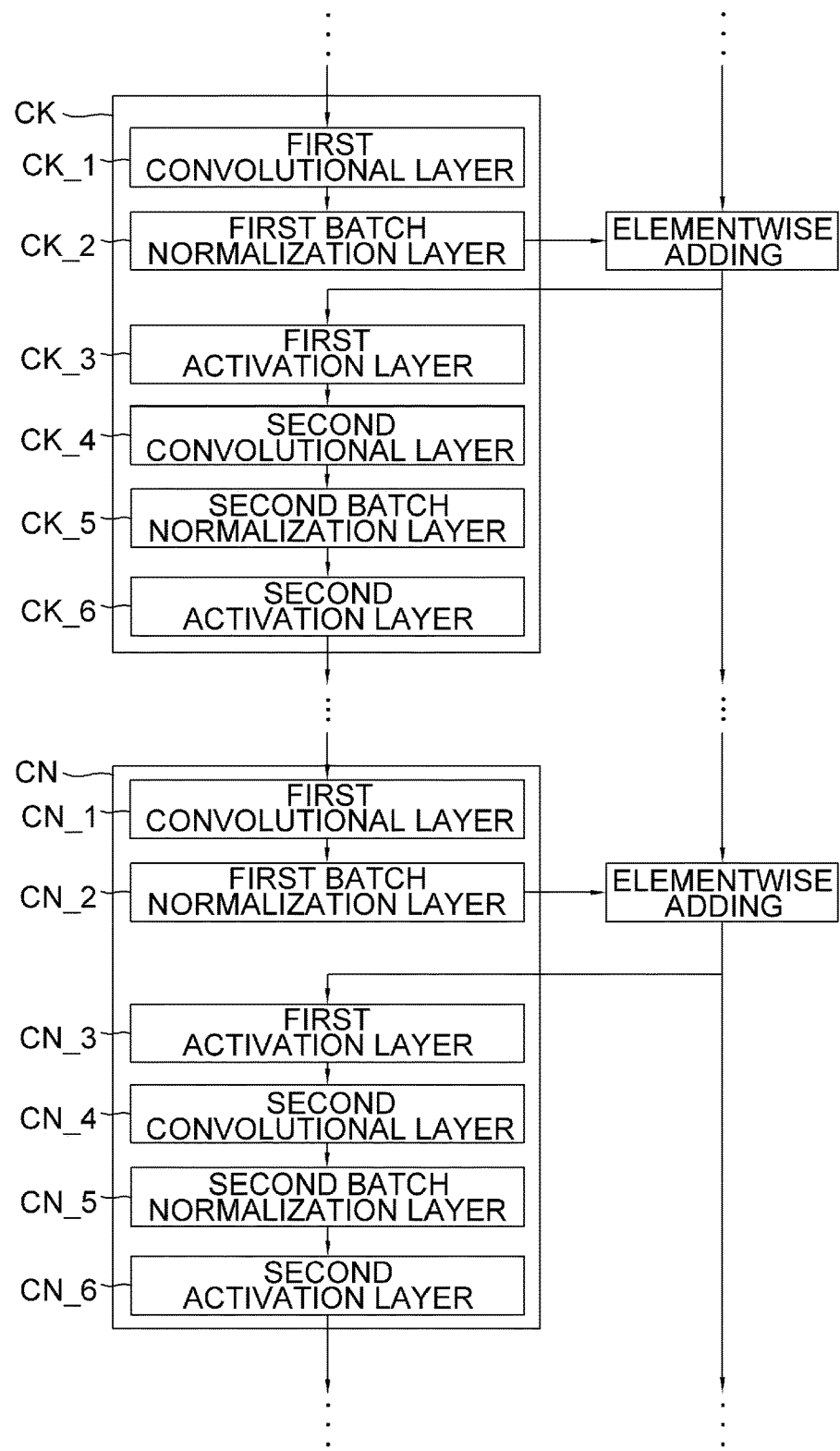

Herein, as described in FIGS. 3A to 3B, the testing device 200 (i) instructs the first convolutional layer C1_1 of the first block C1 to apply the 1×1 convolution operation to the test image to thereby generate the (1_1)-st feature map for testing and (ii) instructs the second convolutional layer C1_4 of the first block C1 to apply the M×M convolution operation to the (1_1)-st feature map for testing or its processed feature map for testing, to thereby generate the (1_2)-nd feature map for testing.

Namely, the testing device 200 (i) instructs the first convolutional layer C1_1 of the first block C1 to apply the 1×1 convolution operation to the test image to thereby generate the (1_1)-st feature map for testing, and (ii) instructs a first batch normalization layer C1_2 of the first block C1 to normalize each of feature values on the (1_1)-st feature map for testing by using averages and variances of the feature values on the (1_1)-st feature map for testing, to thereby generate a normalized (1_1)-st feature map for testing. Further, the testing device instructs a first activation layer C1_3 of the first block C1 to (i) apply a nonlinear operation to each of the feature values on the normalized (1_1)-st feature map for testing to thereby generate a nonlinear (1_1)-st feature map for testing, and then (ii) feed the nonlinear (1_1)-st feature map for testing into the second convolutional layer C1_4 of the first block C1. Further, the testing device 200 (i) instructs the second convolutional layer C1_4 of the first block C1 to apply the M×M convolution operation to the (1_1)-st feature map for testing or its processed feature map for testing, to thereby generate a (1_2)-nd feature map for testing, and (ii) instructs the second batch normalization layer C1_5 of the first block C1 to normalize each of feature values on the (1_2)-nd feature map for testing by using averages and variances of the feature values on the (1_2)-nd feature map for testing, to thereby generate a normalized (1_2)-nd feature map for testing. Further, the testing device 200 instructs the second activation layer C1_6 of the first block C1 to (1) apply the nonlinear operation to each of the feature values on the normalized (1_2)-nd feature map for testing to thereby generate a nonlinear (1_2)-nd feature map for testing and then (2) allow the nonlinear (1_2)-nd feature map for testing to be outputted from the first block C1.

Thereafter, the testing device 200 (i) instructs the first convolutional layer CK-1 of the k-th block CK to apply the 1×1 convolution operation to a {(k−1)_2}-nd feature map for testing, outputted from the (k−1)-th block C(K−1), or its processed feature map for testing, to thereby generate the (k_1)-st feature map for testing, (ii) generates an integrated (k−1)-th feature map for testing by elementwise adding at least part of from the (1_1)-st feature map for testing or its processed feature map for testing to the (k_1)-st feature map for testing or its processed feature map for testing, and (iii) instructs the second convolutional layer CK_4 of the k-th block CK to apply the M×M convolution operation to the integrated (k−1)-th feature map for testing or its processed feature map for testing, to thereby generate the (k_2)-nd feature map for testing, by increasing k from 2 to n.

Herein, the testing device 200 (i) instructs the first convolutional layer CK-1 of the k-th block to apply the 1×1 convolution operation to the {(k−1)_2}-nd feature map for testing, outputted from the (k−1)-th block C(K−1), or its processed feature map for testing, to thereby generate the (k_1)-st feature map for testing, (ii) instructs the first batch normalization layer CK_2 of the k-th block CK to normalize each of feature values on the (k_1)-st feature map for testing by using averages and variances of the feature values on the (k_1)-st feature map for testing, to thereby generate the normalized (k_1)-st feature map for testing. Further, the testing device 200 (i) instructs the first activation layer CK_3 of the k-th block to apply the nonlinear operation to each of the feature values on the integrated (k−1)-th feature map for testing which is generated by elementwise adding at least part of from the normalized (1_1)-st feature map for testing to the normalized (k_1)-st feature map for testing, to thereby generate the nonlinear (k_1)-st feature map for testing, and then (ii) feed the nonlinear (k_1)-st feature map for testing into the second convolutional layer CK_4 of the k-th block CK.

Further, the testing device 200 (i) instructs the second convolutional layer CK_4 of the k-th block CK to apply the M×M convolution operation to the (k_1)-th feature map for testing or its processed feature map for testing, to thereby generate the (k_2)-nd feature map for testing, and (ii) instructs the second batch normalization layer CK 5 of the k-th block CK to normalize each of feature values on the (k_2)-nd feature map for testing by using averages and variances of the feature values on the (k_2)-nd feature map for testing, to thereby generate the normalized (k_2)-nd feature map for testing. Further, the testing device 200 instructs the second activation layer CK_6 of the k-th block CK to (1) apply the nonlinear operation to each of the feature values on the normalized (k_2)-nd feature map for testing to thereby generate the nonlinear (k_2)-nd feature map for testing and then (2) allow the nonlinear (k_2)-nd feature map for testing to be outputted from the k-th block.

Further, it was described above that the integrated (k−1)-th feature map for testing is generated by elementwise adding at least part of from the (1_1)-st feature map for testing, normalized in the first batch normalization layer CK_2, to the (k_1)-st feature map for testing, normalized in the first batch normalization layer CK_2, then the first activation layer CK_3 of the k-th block CK is instructed to apply the non-linear operation.

However, it is possible to generate the integrated (k−1)-th feature map for testing by elementwise adding at least part of from the (1_1)-st feature map for testing, outputted from the first convolutional layer C1_1 of the first block C1, to the (k_1)-st feature map, outputted from the first convolutional layer CK_1 of the k-th block CK.

Namely, as described by referring to FIGS. 4A and 4B, (i) the integrated (k−1)-th feature map for testing is generated by elementwise adding at least part of from the (1_1)-st feature map for testing, outputted from the first convolutional layer C1_1 of the first block C1, to the (k_1)-st feature map, outputted from the first convolutional layer CK_1 of the k-th block CK, (ii) the first batch normalization layer CK_2 of the k-th block CK is instructed to normalize each of feature values on the integrated (k−1)-th feature map for testing by using averages and variances of the feature values on the integrated (k−1)-th feature map for testing, to thereby generate the normalized (k_1)-st feature map for testing, and (iii) the first activation layer CK_3 of the k-th block CK is instructed to (1) apply the nonlinear operation to each of the feature values on the normalized (k_1)-st feature map for testing, to thereby generate the nonlinear (k_1)-st feature map for testing, and then (2) feed the nonlinear (k_1)-st feature map for testing into the second convolutional layer CK_4 of the k-th block CK.

Referring to FIG. 6 again, the testing device 200 (i) instructs the pooling layer 222 to pool an area, corresponding to the region of interest (ROI), on the (n_2)-nd feature map for testing or its processed feature map, to thereby generate the pooled feature map for testing, (ii) feeds the pooled feature map for testing into the feature classifier 223 and instructs the feature classifier 223 to recognize the test image or detect at least one object on the test image.

The present disclosure has an effect of reducing the amount of computation required for extracting the features in the convolutional neural network (CNN) and thereby increasing the computing speed.

The present disclosure has another effect of improving the performance of the feature extraction while reducing the amount of computation.

Hardware optimization through the learning method and the testing method in accordance with the present invention may allow CNN throughput to be improved, and a key performance index to be satisfied. Accordingly, the learning method and the testing method may be appropriate for compact networks, mobile devices, and the like.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A learning method for extracting features from an input image by using a first to an n-th blocks in a convolutional neural network (CNN), comprising steps of:
    (a) a learning device, if a training image is acquired, (i) instructing a first convolutional layer of a first block to apply a 1×1 convolution operation to the training image to thereby generate a (1_1)-st feature map and (ii) instructing a second convolutional layer of the first block to apply an M×M convolution operation to the (1_1)-st feature map or its processed feature map, to thereby generate a (1_2)-nd feature map;
    (b) the learning device (i) instructing a first convolutional layer of a k-th block to apply a 1×1 convolution operation to a {(k−1)_2}-nd feature map, outputted from a (k−1)-th block, or its processed feature map, to thereby generate a (k_1)-st feature map, (ii) generating an integrated (k−1)-th feature map by elementwise adding at least part of from the (1_1)-st feature map or its processed feature map to the (k_1)-st feature map or its processed feature map, and (iii) instructing a second convolutional layer of the k-th block to apply an M×M convolution operation to the integrated (k−1)-th feature map or its processed feature map, to thereby generate a (k_2)-nd feature map, by increasing k from 2 to n; and
    (c) the learning device (i) instructing a pooling layer to pool an area, corresponding to a region of interest (ROI), on an (n_2)-nd feature map or its processed feature map, to thereby generate a pooled feature map, (ii) feeding the pooled feature map into a feature classifier and instructing the feature classifier to recognize the training image or detect at least one object on the training image, and (iii) instructing a loss layer to calculate one or more losses by referring to an output value of the feature classifier and its corresponding ground truth (GT), to thereby adjust at least one parameter of at least part of from the first and the second convolutional layers of the first block to a first and a second convolutional layers of an n-th block through backpropagation by using the losses.

2. The learning method of claim 1, wherein, at the step of (a), the learning device instructs a first batch normalization layer to normalize each of feature values on the (1_1)-st feature map by using averages and variances of the feature values on the (1_1)-st feature map, to thereby generate a normalized (1_1)-st feature map, and instructs a first activation layer of the first block to (i) apply a nonlinear operation to each of the feature values on the normalized (1_1)-st feature map to thereby generate a nonlinear (1_1)-st feature map, and then (ii) feed the nonlinear (1_1)-st feature map into the second convolutional layer of the first block, and
    wherein, at the step of (b), the learning device (i) instructs a first batch normalization layer of the k-th block to normalize each of feature values on the (k_1)-st feature map by using averages and variances of the feature values on the (k_1)-st feature map, to thereby generate a normalized (k_1)-st feature map, and (ii) instructs a first activation layer of the k-th block to apply a nonlinear operation to each of the feature values on the integrated (k−1)-th feature map which is generated by elementwise adding at least part of from the normalized (1_1)-st feature map to the normalized (k_1)-st feature map, to thereby generate a nonlinear (k_1)-st feature map, and then (ii) feed the nonlinear (k_1)-st feature map into the second convolutional layer of the k-th block.

3. The learning method of claim 1, wherein, at the step of (a), the learning device (i) instructs a first batch normalization layer of the first block to normalize each of the feature values on the (1_1)-st feature map by using averages and variances of the feature values on the (1_1)-st feature map, to thereby generate a normalized (1_1)-st feature map, and (ii) instructs a first activation layer of the first block to (1) apply a nonlinear operation to each of the feature values on the normalized (1_1)-st feature map, to thereby generate a nonlinear (1_1)-st feature map and then (2) feed the nonlinear (1_1)-st feature map into the second convolutional layer of the first block, and
    wherein, at the step of (b), the learning device (i) instructs a first batch normalization layer of the k-th block to normalize each of feature values on the integrated (k−1)-th feature map which is generated by elementwise adding at least part of from the (1_1)-st feature map to the (k_1)-st feature map, to thereby generate a normalized (k_1)-st feature map, and (ii) instructs a first activation layer of the k-th block to (1) apply a nonlinear operation to each of the feature values on the normalized (k_1)-st feature map to thereby generate a nonlinear (k_1)-st feature map, and then (2) feed the nonlinear (k_1)-st feature map into the second convolutional layer of the k-th block.

4. The learning method of claim 1, wherein, at the step of (a), the learning device (i) instructs a second batch normalization layer of the first block to normalize each of feature values on the (1_2)-nd feature map by using averages and variances of the feature values on the (1_2)-nd feature map, to thereby generate a normalized (1_2)-nd feature map, and (ii) instructs a second activation layer of the first block to (1) apply a nonlinear operation to each of the feature values on the normalized (1_2)-nd feature map to thereby generate a nonlinear (1_2)-nd feature map and then (2) allow the nonlinear (1_2)-nd feature map to be outputted from the first block, and wherein, at the step of (b), the learning device (i) instructs a second batch normalization layer of the k-th block to normalize each of feature values on the (k_2)-nd feature map by using averages and variances of the feature values on the (k_2)-nd feature map, to thereby generate a normalized (k_2)-nd feature map, and (ii) instructs a second activation layer of the k-th block to (1) apply a nonlinear operation to each of the feature values on the normalized (k_2)-nd feature map to thereby generate a nonlinear (k_2)-nd feature map and then (2) allow the nonlinear (k_2)-nd feature map to be outputted from the k-th block.

5. The learning method of claim 1, wherein the learning device (i) instructs the first convolutional layer of the first block to apply the 1×1 convolution operation to the training image and (ii) instructs the first convolutional layer of the k-th block to apply the 1×1 convolution operation to the {(k−1)_2}-nd feature map or its processed feature map, to thereby increase its feature dimension by C times.

6. The learning method of claim 5, wherein the C is smaller than the M×M.

7. A testing method for extracting features from an input image by using a first to an n-th blocks in a convolutional neural network (CNN), comprising steps of:

(a) on condition that a learning device has performed a first process of (i) instructing a first convolutional layer of a first block to apply a 1×1 convolution operation to a training image to thereby generate a (1_1)-st feature map for training and (ii) instructing a second convolutional layer of the first block to apply an M×M convolution operation to the (1_1)-st feature map for training or its processed feature map for training, to thereby generate a (1_2)-nd feature map for training, has performed a second process of (i) instructing a first convolutional layer of a k-th block to apply a 1×1 convolution operation to a {(k−1)_2}-nd feature map for training, outputted from a (k−1)-th block, or its processed feature map for training, to thereby generate a (k_1)-st feature map for training, (ii) generating a (k−1)-th integrated feature map for training by elementwise adding at least part of from the (1_1)-st feature map for training or its processed feature map for training to the (k_1)-st feature map for training or its processed feature map for training, and (iii) instructing a second convolutional layer of the k-th block to apply an M×M convolution operation to the integrated (k−1)-th feature map for training or its processed feature map for training, to thereby generate a (k_2)-nd feature map for training, by increasing k from 2 to n, and has performed a third process of (i) instructing a pooling layer to pool an area for training, corresponding to a region of interest (ROI) for training, on an (n_2)-nd feature map for training or its processed feature map for training, to thereby generate a pooled feature map for training, (ii) feeding the pooled feature map for training into a feature classifier and instructing the feature classifier to recognize the training image or detect at least one object on the training image, and (iii) instructing a loss layer to calculate one or more losses by referring to an output value of the feature classifier and its corresponding ground truth (GT), to thereby adjust at least one parameter of at least part of from the first and the second convolutional layers of the first block to a first and a second convolutional layers of an n-th block through backpropagation by using the losses, a testing device (i) acquiring a test image and instructing the first convolutional layer of the first block to apply the 1×1 convolution operation to the test image to thereby generate a (1_1)-st feature map for testing and (ii) instructing the second convolutional layer of the first block to apply the M×M convolution operation to the (1_1)-st feature map for testing or its processed feature map for testing, to thereby generate a (1_2)-nd feature map for testing;

(b) the testing device (i) instructing the first convolutional layer of the k-th block to apply the 1×1 convolution operation to a {(k−1)_2}-nd feature map for testing, outputted from the (k−1)-th block, or its processed feature map for testing, to thereby generate a (k_1)-st feature map for testing, (ii) generating an integrated (k−1)-th feature map for testing by elementwise adding at least part of from the (1_1)-st feature map for testing or its processed feature map for testing to the (k_1)-st feature map for testing or its processed feature map for testing, and (iii) instructing the second convolutional layer of the k-th block to apply the M×M convolution operation to the integrated (k−1)-th feature map for testing or its processed feature map for testing, to thereby generate a (k_2)-nd feature map for testing, by increasing k from 2 to n; and (c) the testing device (i) instructing the pooling layer to pool an area for testing, corresponding to a region of interest (ROI) for testing, on an (n_2)-nd feature map for testing or its processed feature map for testing, to thereby generate a pooled feature map for testing, and (ii) feeding the pooled feature map for testing into the feature classifier and instructing the feature classifier to recognize the test image or detect at least one object on the test image.

8. The testing method of claim 7, wherein, at the step of (a), the testing device instructs a first batch normalization layer to normalize each of feature values on the (1_1)-st feature map for testing by using averages and variances of the feature values on the (1_1)-st feature map for testing, to thereby generate a normalized (1_1)-st feature map for testing, and instructs a first activation layer of the first block to (i) apply a nonlinear operation to each of the feature values on the normalized (1_1)-st feature map for testing to thereby generate a nonlinear (1_1)-st feature map for testing, and then (ii) feed the nonlinear (1_1)-st feature map for testing into the second convolutional layer of the first block, and wherein, at the step of (b), the testing device (i) instructs a first batch normalization layer of the k-th block to normalize each of feature values on the (k_1)-st feature map for testing by using averages and variances of the feature values on the (k_1)-st feature map for testing, to thereby generate a normalized (k_1)-st feature map for testing, and (ii) instructs a first activation layer of the k-th block to apply a nonlinear operation to each of the feature values on the integrated (k−1)-th feature map for testing which is generated by elementwise adding at least part of from the normalized (1_1)-st feature map for testing to the normalized (k_1)-st feature map for testing, to thereby generate a nonlinear (k_1)-st feature map for testing, and then (ii) feed the nonlinear (k_1)-st feature map for testing into the second convolutional layer of the k-th block.

9. The testing method of claim 7, wherein, at the step of (a), the testing device (i) instructs a first batch normalization layer of the first block to normalize each of the feature values on the (1_1)-st feature map for testing by using averages and variances of the feature values on the (1_1)-st feature map for testing, to thereby generate a normalized (1_1)-st feature map for testing, and (ii) instructs a first activation layer of the first block to (1) apply a nonlinear operation to each of the feature values on the normalized (1_1)-st feature map for testing, to thereby generate a nonlinear (1_1)-st feature map for testing and then (2) feed the nonlinear (1_1)-st feature map for testing into the second convolutional layer of the first block, and wherein, at the step of (b), the testing device (i) instructs a first batch normalization layer of the k-th block to normalize each of feature values on the integrated (k−1)-th feature map for testing which is generated by elementwise adding at least part of from the (1_1)-st feature map for testing to the (k_1)-st feature map for testing, to thereby generate a normalized (k_1)-st feature map for testing, and (ii) instructs a first activation layer of the k-block to (1) apply a nonlinear operation to each of the feature values on the normalized (k_1)-st feature map for testing to thereby generate a nonlinear (k_1)-st feature map for testing, and then (2) feed the nonlinear (k_1)-st feature map for testing into the second convolutional layer of the k-th block.

10. The testing method of claim 7, wherein, at the step of (a), the testing device (i) instructs a second batch normalization layer of the first block to normalize each of feature values on the (1_2)-nd feature map for testing by using averages and variances of the feature values on the (1_2)-nd feature map for testing, to thereby generate a normalized (1_2)-nd feature map for testing, and (ii) instructs a second activation layer of the first block to (1) apply a nonlinear operation to each of the feature values on the normalized (1_2)-nd feature map for testing to thereby generate a nonlinear (1_2)-nd feature map for testing and then (2) allow the nonlinear (1_2)-nd feature map for testing to be outputted from the first block, and wherein, at the step of (b), the testing device (i) instructs a second batch normalization layer of the k-th block to normalize each of feature values on the (k_2)-nd feature map for testing by using averages and variances of the feature values on the (k_2)-nd feature map for testing, to thereby generate a normalized (k_2)-nd feature map for testing, and (ii) instructs a second activation layer of the k-th block to (1) apply a nonlinear operation to each of the feature values on the normalized (k_2)-nd feature map for testing to thereby generate a nonlinear (k_2)-nd feature map for testing and then (2) allow the nonlinear (k_2)-nd feature map for testing to be outputted from the k-th block.

11. The testing method of claim 7, wherein the testing device (i) instructs the first convolutional layer of the first block to apply the 1×1 convolution operation to the test image and (ii) instructs the first convolutional layer of the k-th block to apply the 1×1 convolution operation to the {(k−1)_2}-nd feature map for testing or its processed feature map for testing, to thereby increase its feature dimension for testing by C times.

12. The testing method of claim 11, wherein the C is smaller than the M×M.

13. A learning device for extracting features from an input image by using a first to an n-th blocks in a convolutional neural network (CNN), comprising:

at least one memory that stores instructions; and at least one processor configured to execute the instructions to: perform processes of (I) (i) instructing a first convolutional layer of a first block to apply a 1×1 convolution operation to a training image to thereby generate a (1_1)-st feature map and (ii) instructing a second convolutional layer of the first block to apply an M×M convolution operation to the (1_1)-st feature map or its processed feature map, to thereby generate a (1_2)-nd feature map, (II) (i) instructing a first convolutional layer of a k-th block to apply a 1×1 convolution operation to a {(k−)_2}-nd feature map, outputted from a (k−1)-th block, or its processed feature map, to thereby generate a (k_1)-st feature map, (ii) generating an integrated (k−1)-th feature map by elementwise adding at least part of from the (1_1)-st feature map or its processed feature map to the (k_1)-st feature map or its processed feature map, and (iii) instructing a second convolutional layer of the k-th block to apply an M×M convolution operation to the integrated (k−1)-th feature map or its processed feature map, to thereby generate a (k_2)-nd feature map, by increasing k from 2 to n, and (III) (i) instructing a pooling layer to pool an area, corresponding to a region of interest (ROI), on an (n_2)-nd feature map or its processed feature map, to thereby generate a pooled feature map, (ii) feeding the pooled feature map into a feature classifier and instructing the feature classifier to recognize the training image or detect at least one object on the training image, and (iii) instructing a loss layer to calculate one or more losses by referring to an output value of the feature classifier and its corresponding ground truth (GT), to thereby adjust at least one parameter of at least part of from the first and the second convolutional layers of the first block to a first and a second convolutional layers of an n-th block through backpropagation by using the losses.

14. The learning device of claim 13, wherein, at the process of (I), the processor instructs a first batch normalization layer to normalize each of feature values on the (1_1)-st feature map by using averages and variances of the feature values on the (1_1)-st feature map, to thereby generate a normalized (1_1)-st feature map, and instructs a first activation layer of the first block to (i) apply a nonlinear operation to each of the feature values on the normalized (1_1)-st feature map to thereby generate a nonlinear (1_1)-st feature map, and then (ii) feed the nonlinear (1_1)-st feature map into the second convolutional layer of the first block, and wherein, at the process of (II), the processor (i) instructs a first batch normalization layer of the k-th block to normalize each of feature values on the (k_1)-st feature map by using averages and variances of the feature values on the (k_1)-st feature map, to thereby generate a normalized (k_1)-st feature map, and (ii) instructs a first activation layer of the k-th block to apply a nonlinear operation to each of the feature values on the integrated (k−1)-th feature map which is generated by elementwise adding at least part of from the normalized (1_1)-st feature map to the normalized (k_1)-st feature map, to thereby generate a nonlinear (k_1)-st feature map, and then (ii) feed the nonlinear (k_1)-st feature map into the second convolutional layer of the k-th block.

15. The learning device of claim 13, wherein, at the process of (I), the processor (i) instructs a first batch normalization layer of the first block to normalize each of the feature values on the (1_1)-st feature map by using averages and variances of the feature values on the (1_1)-st feature map, to thereby generate a normalized (1_1)-st feature map, and (ii) instructs a first activation layer of the first block to (1) apply a nonlinear operation to each of the feature values on the normalized (1_1)-st feature map, to thereby generate a nonlinear (1_1)-st feature map and then (2) feed the nonlinear (1_1)-st feature map into the second convolutional layer of the first block, and wherein, at the process of (II), the processor (i) instructs a first batch normalization layer of the k-th block to normalize each of feature values on the integrated (k−1)-th feature map which is generated by element-wise adding at least part of from the (1_1)-st feature map to the (k_1)-st feature map, to thereby generate a normalized (k_1)-st feature map, and (ii) instructs a first activation layer of the k-block to (1) apply a nonlinear operation to each of the feature values on the normalized (k_1)-st feature map to thereby generate a nonlinear (k_1)-st feature map, and then (2) feed the nonlinear (k_1)-st feature map into the second convolutional layer of the k-th block.

16. The learning device of claim 13, wherein, at the process of (I), the processor (i) instructs a second batch normalization layer of the first block to normalize each of feature values on the (1_2)-nd feature map by using averages and variances of the feature values on the (1_2)-nd feature map, to thereby generate a normalized (1_2)-nd feature map, and (ii) instructs a second activation layer of the first block to (1) apply a nonlinear operation to each of the feature values on the normalized (1_2)-nd feature map to thereby generate a nonlinear (1_2)-nd feature map and then (2) allow the nonlinear (1_2)-nd feature map to be outputted from the first block, and wherein, at the process of (II), the processor (i) instructs a second batch normalization layer of the k-th block to normalize each of feature values on the (k_2)-nd feature map by using averages and variances of the feature values on the (k_2)-nd feature map, to thereby generate a normalized (k_2)-nd feature map, and (ii) instructs a second activation layer of the k-th block to (1) apply a nonlinear operation to each of the feature values on the normalized (k_2)-nd feature map to thereby generate a nonlinear (k_2)-nd feature map and then (2) allow the nonlinear (k_2)-nd feature map to be outputted from the k-th block.

17. The learning device of claim 13, wherein the processor (i) instructs the first convolutional layer of the first block to apply the 1×1 convolution operation to the training image and (ii) instructs the first convolutional layer of the k-th block to apply the 1×1 convolution operation to the {(k−1)_2}-nd feature map or its processed feature map, to thereby increase its feature dimension by C times.

18. The learning device of claim 17, wherein the C is smaller than the M×M.

19. A testing device for extracting features from an input image by using a first to an n-th blocks in a convolutional neural network (CNN), comprising:

at least one memory that stores instructions; and
at least one processor, on condition that a learning device has performed a first process of (i) instructing a first convolutional layer of a first block to apply a 1×1 convolution operation to a training image to thereby generate a (1_1)-st feature map for training and (ii) instructing a second convolutional layer of the first block to apply an M×M convolution operation to the (1_1)-st feature map for training or its processed feature map for training, to thereby generate a (1_2)-nd feature map for training, has performed a second process of (i) instructing a first convolutional layer of a k-th block to apply a 1×1 convolution operation to a {(k−1)_2}-nd feature map for training, outputted from a (k−1)-th block, or its processed feature map for training, to thereby generate a (k_1)-st feature map for training, (ii) generating a (k−1)-th integrated feature map for training by elementwise adding at least part of from the (1_1)-st feature map for training or its processed feature map for training to the (k_1)-st feature map for training or its processed feature map for training, and (iii) instructing a second convolutional layer of the k-th block to apply an M×M convolution operation to the integrated (k−1)-th feature map for training or its processed feature map for training, to thereby generate a (k_2)-nd feature map for training, by increasing k from 2 to n, and has performed a third process of (i) instructing a pooling layer to pool an area for training, corresponding to a region of interest (ROI) for training, on an (n_2)-nd feature map for training or its processed feature map for training, to thereby generate a pooled feature map for training, (ii) feeding the pooled feature map for training into a feature classifier and instructing the feature classifier to recognize the training image or detect at least one object on the training image, and (iii) instructing a loss layer to calculate one or more losses by referring to an output value of the feature classifier and its corresponding ground truth (GT), to thereby adjust at least one parameter of at least part of from the first and the second convolutional layers of the first block to a first and a second convolutional layers of an n-th block through backpropagation by using the losses; configured to execute the instructions to: perform processes of (I) (i) instructing the first convolutional layer of the first block to apply the 1×1 convolution operation to a test image to thereby generate a (1_1)-st feature map for testing and (ii) instructing the second convolutional layer of the first block to apply the M×M convolution operation to the (1_1)-st feature map for testing or its processed feature map for testing, to thereby generate a (1_2)-nd feature map for testing, (II) (i) instructing the first convolutional layer of the k-th block to apply the 1×1 convolution operation to a {(k−1)_2}-nd feature map for testing, outputted from the (k−1)-th block, or its processed feature map for testing, to thereby generate a (k_1)-st feature map for testing, (ii) generating an integrated (k−1)-th feature map for testing by elementwise adding at least part of from the (1_1)-st feature map for testing or its processed feature map for testing to the (k_1)-st feature map for testing or its processed feature map for testing, and (iii) instructing the second convolutional layer of the k-th block to apply the M×M convolution operation to the integrated (k−1)-th feature map for testing or its processed feature map for testing, to thereby generate a (k_2)-nd feature map for testing, by increasing k from 2 to n, and (III) (i) instructing the pooling layer to pool an area for testing, corresponding to a region of interest (ROI) for testing, on an (n_2)-nd feature map for testing or its processed feature map for testing, to thereby generate a pooled feature map for testing, and (ii) feeding the pooled feature map for testing into the feature classifier and instructing the feature classifier to recognize the test image or detect at least one object on the test image.

20. The testing device of claim 19, wherein, at the process of (I), the processor instructs a first batch normalization layer to normalize each of feature values on the (1_1)-st feature map for testing by using averages and variances of the feature values on the (1_1)-st feature map for testing, to thereby generate a normalized (1_1)-st feature map for testing, and instructs a first activation layer of the first block to (i) apply a nonlinear operation to each of the feature values on the normalized (1_1)-st feature map for testing to thereby generate a nonlinear (1_1)-st feature map for testing, and then (ii) feed the nonlinear (1_1)-st feature map for testing into the second convolutional layer of the first block, and wherein, at the process of (II), the processor (i) instructs a first batch normalization layer of the k-th block to normalize each of feature values on the (k_1)-st feature map for testing by using averages and variances of the feature values on the (k_1)-st feature map for testing, to thereby generate a normalized (k_1)-st feature map for testing, and (ii) instructs a first activation layer of the k-th block to apply a nonlinear operation to each of the feature values on the integrated (k−1)-th feature map for testing which is generated by elementwise adding at least part of from the normalized (1_1)-st feature map for testing to the normalized (k_1)-st feature map for testing, to thereby generate a nonlinear (k_1)-st feature map for testing, and then (ii) feed the nonlinear (k_1)-st feature map for testing into the second convolutional layer of the k-th block.

21. The testing device of claim 19, wherein, at the process of (I), the processor (i) instructs a first batch normalization layer of the first block to normalize each of the feature values on the (1_1)-st feature map for testing by using averages and variances of the feature values on the (1_1)-st feature map for testing, to thereby generate a normalized (1_1)-st feature map for testing, and (ii) instructs a first activation layer of the first block to (1) apply a nonlinear operation to each of the feature values on the normalized (1_1)-st feature map for testing, to thereby generate a nonlinear (1_1)-st feature map for testing and then (2) feed the nonlinear (1_1)-st feature map for testing into the second convolutional layer of the first block, and wherein, at the process of (II), the processor (i) instructs a first batch normalization layer of the k-th block to normalize each of feature values on the integrated (k−1)-th feature map for testing which is generated by elementwise adding at least part of from the (1_1)-st feature map for testing to the (k_1)-st feature map for testing, to thereby generate a normalized (k_1)-st feature map for testing, and (ii) instructs a first activation layer of the k-th block to (1) apply a nonlinear operation to each of the feature values on the normalized (k_1)-st feature map for testing to thereby generate a nonlinear (k_1)-st feature map for testing, and then (2) feed the nonlinear (k_1)-st feature map for testing into the second convolutional layer of the k-th block.

22. The testing device of claim 19, wherein, at the process of (I), the processor (i) instructs a second batch normalization layer of the first block to normalize each of feature values on the (1_2)-nd feature map for testing by using averages and variances of the feature values on the (1_2)-nd feature map for testing, to thereby generate a normalized (1_2)-nd feature map for testing, and (ii) instructs a second activation layer of the first block to (1) apply a nonlinear operation to each of the feature values on the normalized (1_2)-nd feature map for testing to thereby generate a nonlinear (1_2)-nd feature map for testing and then (2) allow the nonlinear (1_2)-nd feature map for testing to be outputted from the first block, and wherein, at the process of (II), the processor (i) instructs a second batch normalization layer of the k-th block to normalize each of feature values on the (k_2)-nd feature map for testing by using averages and variances of the feature values on the (k_2)-nd feature map for testing, to thereby generate a normalized (k_2)-nd feature map for testing, and (ii) instructs a second activation layer of the k-th block to (1) apply a nonlinear operation to each of the feature values on the normalized (k_2)-nd feature map for testing to thereby generate a nonlinear (k_2)-nd feature map for testing and then (2) allow the nonlinear (k_2)-nd feature map for testing to be outputted from the k-th block.

23. The testing device of claim 19, wherein the processor (i) instructs the first convolutional layer of the first block to apply the 1×1 convolution operation to the test image and (ii) instructs the first convolutional layer of the k-th block to apply the 1×1 convolution operation to the {(k−1)_2}-nd feature map for testing or its processed feature map for testing, to thereby increase its feature dimension for testing by C times.

24. The testing device of claim 23, wherein the C is smaller than the M×M.

* * * * *